United States Patent
Mangone, Jr.

(10) Patent No.: US 7,617,883 B1
(45) Date of Patent: Nov. 17, 2009

(54) FASTENING DEVICES, METHOD OF MANUFACTURE, TOOL, AND METHOD OF USE

(76) Inventor: Peter G. Mangone, Jr., 12687 W. Cedar Dr., Suite 100, Lakewood, CO (US) 80228

(*) Notice: Subject to any disclaimer, the term of this patent is extended or adjusted under 35 U.S.C. 154(b) by 446 days.

(21) Appl. No.: 11/445,899

(22) Filed: Jun. 2, 2006

Related U.S. Application Data

(60) Provisional application No. 60/797,520, filed on May 4, 2006.

(51) Int. Cl.
*B27F 7/30* (2006.01)
*B27F 7/38* (2006.01)
*B25C 5/10* (2006.01)
*B25C 5/16* (2006.01)

(52) U.S. Cl. .................. 173/1; 227/114; 227/120; 227/137; 227/138; 227/139; 81/435

(58) Field of Classification Search .............. 227/8, 227/114, 120, 136, 139; 81/434, 435; 173/1
See application file for complete search history.

(56) References Cited

U.S. PATENT DOCUMENTS

| | | | | |
|---|---|---|---|---|
| 3,524,576 | A | * | 8/1970 | Bader .................. 227/136 |
| 3,593,904 | A | * | 7/1971 | Gaya ................... 227/128 |
| 3,666,157 | A | * | 5/1972 | Kawai et al. ............ 227/131 |
| 4,002,281 | A | * | 1/1977 | Hsu .................... 227/63 |
| 4,182,474 | A | * | 1/1980 | Sato ................... 227/99 |
| 4,619,392 | A | * | 10/1986 | Won .................... 227/120 |
| 4,801,061 | A | | 1/1989 | Mangone, Jr. |
| 4,801,064 | A | | 1/1989 | Mangone, Jr. |
| 4,942,996 | A | * | 7/1990 | Wolfberg et al. .......... 227/136 |
| 5,350,267 | A | | 9/1994 | Mangone, Jr. |
| 5,558,264 | A | * | 9/1996 | Weinstein ............... 227/10 |
| 5,683,024 | A | * | 11/1997 | Eminger et al. ........... 227/8 |
| 5,718,548 | A | | 2/1998 | Cotellessa |
| 5,735,444 | A | | 4/1998 | Wingert |
| 5,738,266 | A | * | 4/1998 | Ogawa ................. 227/128 |
| 5,799,856 | A | * | 9/1998 | Mukoyama ............ 112/112 |
| 6,021,982 | A | | 2/2000 | Mangone, Jr. |
| 6,170,730 | B1 | * | 1/2001 | Lin ..................... 227/119 |
| 6,305,891 | B1 | | 10/2001 | Burlingame |
| 6,481,612 | B1 | | 11/2002 | Mangone, Jr. |
| 6,530,803 | B1 | | 3/2003 | Chen |
| 6,698,642 | B2 | | 3/2004 | Chen |
| 6,708,860 | B1 | * | 3/2004 | Thieleke ................ 227/8 |
| 6,994,240 | B2 | * | 2/2006 | Jakob et al. ............. 227/8 |
| 7,097,086 | B2 | * | 8/2006 | Joyce et al. ............. 227/120 |
| 7,225,962 | B2 | * | 6/2007 | Porth et al. ............. 227/136 |

(Continued)

*Primary Examiner*—Rinaldi I Rada
*Assistant Examiner*—Gloria R Weeks

(57) ABSTRACT

A strip of fasteners may be provided with connecting portions between individual fasteners. Each individual fastener may include a body portion and at least one nail portion. The body portion may include at least a pair of leg members spaced from one another in a first direction and a crown portion joining the at least a pair of leg members. The nail portion may include an elongated shaft portion having a shaft portion central longitudinal axis and an elongated head portion attached to one end of the shaft portion. The elongated head portion may have a head portion central longitudinal axis that is transverse to the shaft portion central longitudinal axis. In a method of manufacturing the strip of fasteners, the nails may be simultaneously inserted into each fastener body portion. In a tool for installing fasteners, a pivot member may be provided to prevent jamming.

5 Claims, 17 Drawing Sheets

U.S. PATENT DOCUMENTS 7,416,100 B2 *  8/2008  Fielitz ........................... 227/8
7,438,206 B2 * 10/2008  Kumayama ................. 227/127

2005/0028346 A1  2/2005  Mangone, Jr.

* cited by examiner

FASTENING DEVICES, METHOD OF MANUFACTURE, TOOL, AND METHOD OF USE

This application claims priority from U.S. Provisional Patent Application Ser. No. 60/797,520 filed May 4, 2006 for FASTENING DEVICES, METHOD OF MANUFACTURE, TOOL, AND METHOD OF USE of Peter Mangone, Jr., which is hereby incorporated by reference for all that is disclosed therein.

BACKGROUND

Fastening devices, such as clips and staples, are commonly used to attach objects (e.g., cylindrical objects) to generally planar surfaces such as substrates. Examples of such objects include conduits such as electrical conductors (e.g., cables and wires) and also tubing and pipes designed to carry fluids, such as water. Such conduits may, for example, be generally circular in cross section (in the case, for example, of a typical water pipe or electrical conduit) or may, alternatively, have a different cross-sectional shape (e.g., elliptical or rectangular). Such fastening devices may, for example, be used to facilitate the installation of electrical conduits or fluid carrying pipes during building construction and/or renovation projects.

A typical fastening device generally includes a pair of leg members joined by a crown portion. To secure an object to a substrate, the fastening device is generally arranged such that the legs straddle the object.

In one type of fastening device, one or both of the legs are then driven directly into the substrate (e.g., by hammering or through the use of an automated or semi-automated installation tool) such that the object is secured between the substrate and the crown portion of the fastening device. This type of fastening device is typically used in conjunction with substrates made of relatively softer material. An example of this type of fastening device is disclosed in published U.S. Patent Application No. 20050028346 of Mangone, Jr. for FASTENING DEVICE, FASTENING SYSTEM AND RELATED METHODS, which is hereby incorporated by reference for all that is disclosed therein.

In another type of fastening device, one or more separate substrate penetrating members (e.g., screws or nails) are engaged with the leg members and then driven into the substrate. This type of fastening device is typically used in conjunction with substrates made of relatively harder material, e.g, wood. Examples of this type of fastening device are generally disclosed in the following U.S. Pat. Nos. 4,801,061 of Mangone, Jr. for FORCABLE MOUNTING APPARATUS AND METHOD; 4,801,064 of Mangone, Jr. for CABLE MOUNTING APPARATUS AND METHOD; 5,350,267 of Mangone, Jr. for APPARATUS FOR MOUNTING RELATIVELY RIGID OBJECTS and 6,021,982 of Mangone, Jr. for CABLE CLIP, all of which are hereby incorporated by reference for all that is disclosed therein.

SUMMARY

Disclosed herein is an exemplary embodiment of a plurality of fasteners including at least a first fastener and a second fastener adjacent the first fastener. Each of the plurality of fasteners includes a body portion and at least one nail. The body portion includes at least a pair of leg members spaced from one another in a first direction and a crown portion joining the at least a pair of leg members. The nail includes an elongated shaft portion having a shaft portion central longitudinal axis and an elongated head portion attached to one end of the shaft portion. The elongated head portion may have a head portion central longitudinal axis that is transverse to the shaft portion central longitudinal axis. The shaft portion of the nail extends at least partially through one of the body portion leg members. The head portion central longitudinal axis is transverse to the first direction.

Also disclosed is an exemplary embodiment of a method of making a plurality of fasteners. The method may include integrally forming a strip of body portions including at least a first body portion and a second body portion connected to the first body portion. Each of the body portions may include at least first and second spaced leg members and a crown portion joining the first and second leg members. The method may further include simultaneously inserting a nail into the first leg member of the first body portion, the second leg member of the first body portion, the first leg member of the second body portion and the second leg member of the second body portion.

Also disclosed is an exemplary embodiment of a tool for installing fasteners. The tool may include a housing and a chamber within the housing. The chamber may be capable of holding a plurality of the fasteners and may define therewithin a first movement path along which fasteners can move in a first direction. At least one opening may be provided in the housing, the opening communicating with the chamber. A second movement path may be defined along which a fastener can be moved during installation of a fastener. The second movement path may extend through the opening and be transverse to the first movement path. A pivot member may be pivotally mounted to the housing about a pivot axis and at least partially located within the chamber. The pivot member may include first and second portions. The pivot member may be capable of pivoting about the pivot axis between at least a first position and a second position. In the first position, the pivot member first portion is in the second movement path and the pivot member second portion is not in the first movement path. In the second position, the pivot member first portion is not in the second movement path and the pivot member second portion is in the first movement path.

Also disclosed herein is an exemplary embodiment of a method which includes providing a tool. The tool may include a housing and a chamber within the housing. The chamber may be capable of holding a plurality of fasteners and may define therewithin a movement path along which fasteners can move in a first direction. The tool may further include a pivot member pivotally mounted to the housing about a pivot axis and at least partially located within the chamber. The pivot member may include first and second portions. The method may further include providing a plurality of fasteners within the chamber. The plurality of fasteners may include a first fastener and an adjacent second fastener. The method may further include causing movement of the first fastener relative to the second fastener in a second direction. The movement of the first fastener in the second direction may cause forcible engagement between the first fastener and the pivot member first portion. The forcible engagement between the first fastener and the pivot member first portion may cause pivoting of the pivot member about the pivot axis and pivoting of the pivot member may cause the pivot member second portion to enter the movement path.

DETAILED DESCRIPTION

Figure 1:
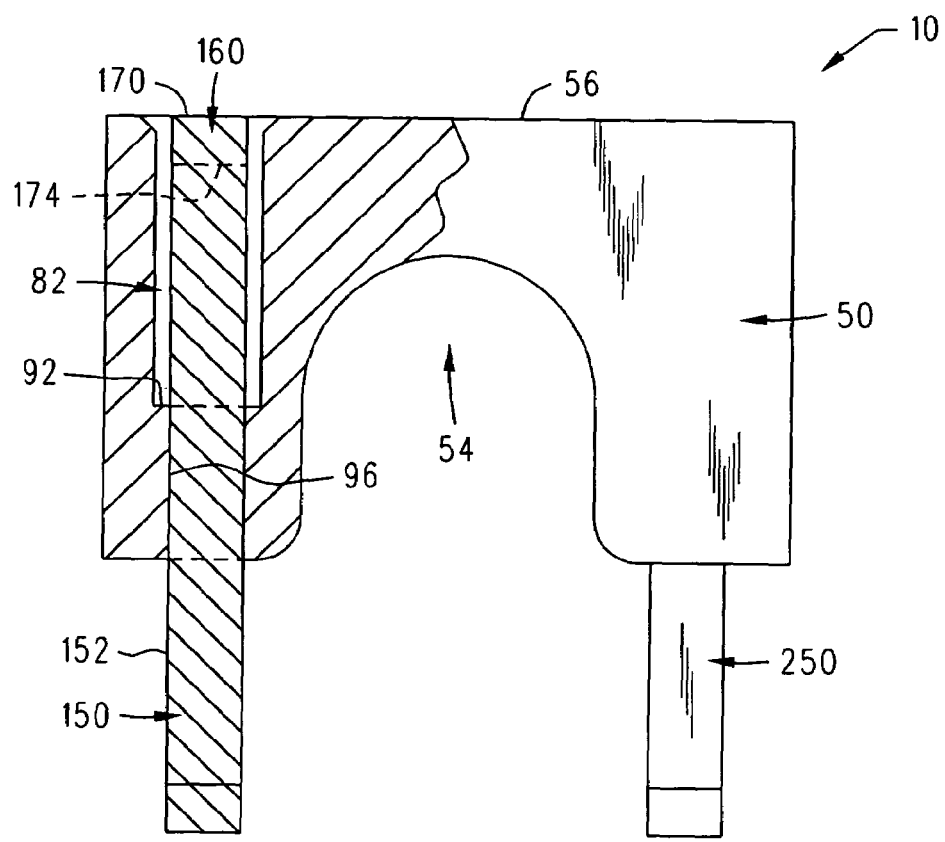
FIG. 1 is a front elevational, part cross-sectional view illustrating an exemplary fastener including a body portion and a pair of nails.
Figure 2:
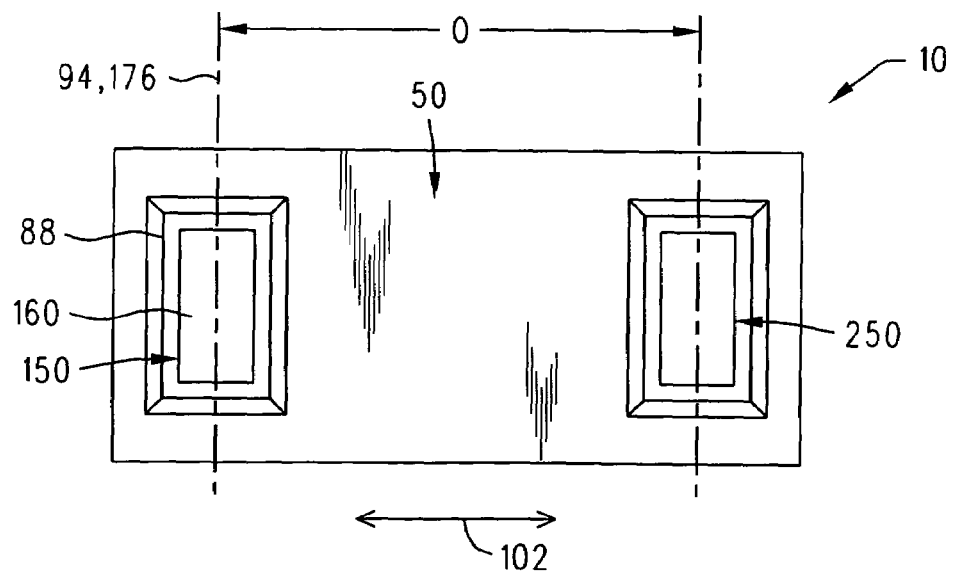
FIG. 2 is a top plan view illustrating the exemplary fastener of FIG. 1.

FIGS. 1 and 2 illustrate a fastener 10. The fastener 10 may include a body portion 50 and a pair of nails 150, 250, as shown. Fastener 10 may be of the type, for example, used to facilitate attachment of an object, e.g., an electrical cable to a substrate, for example wood or other material used to form a wall or floor.

Figure 3:
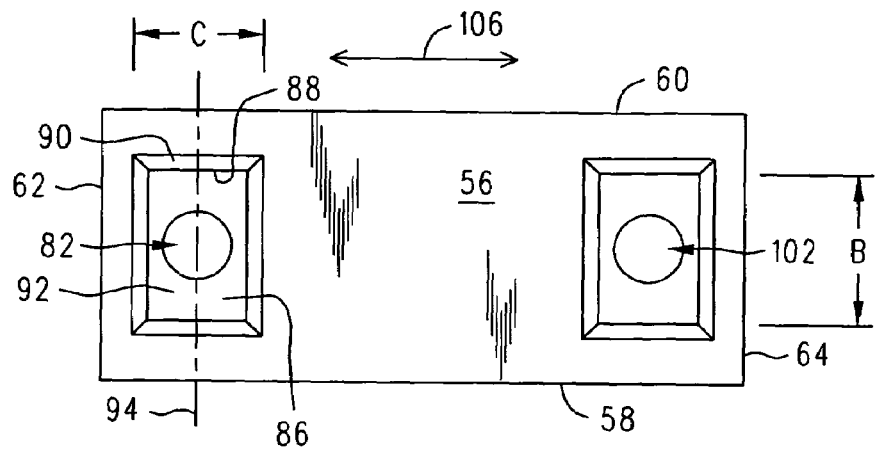
FIG. 3 is a top plan view illustrating the body portion of the exemplary fastener of FIG. 1.
Figure 4:
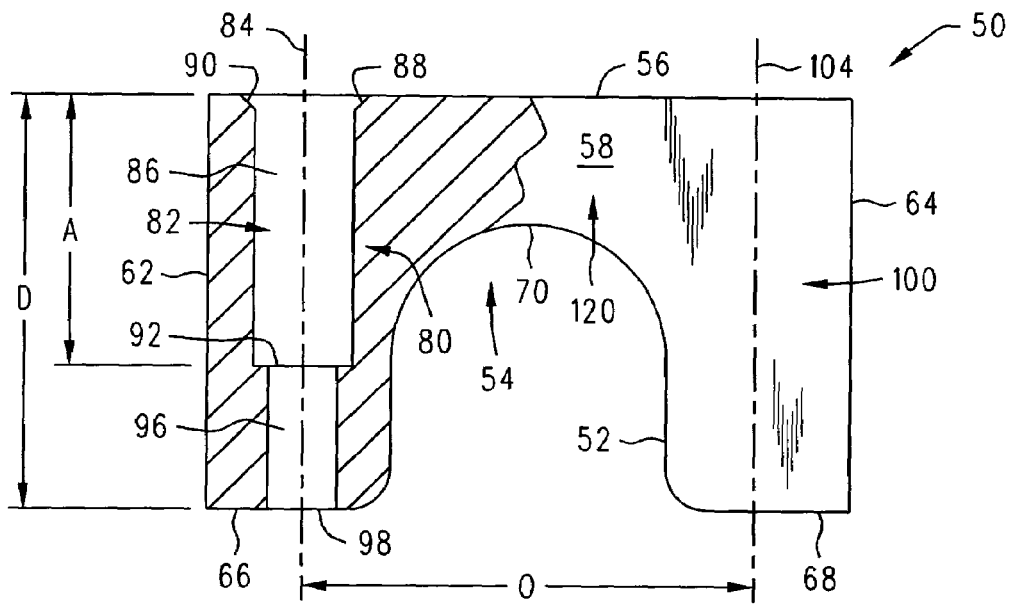
FIG. 4 is a front elevational, part cross-sectional view illustrating the exemplary body portion of FIG. 3
Figure 5:
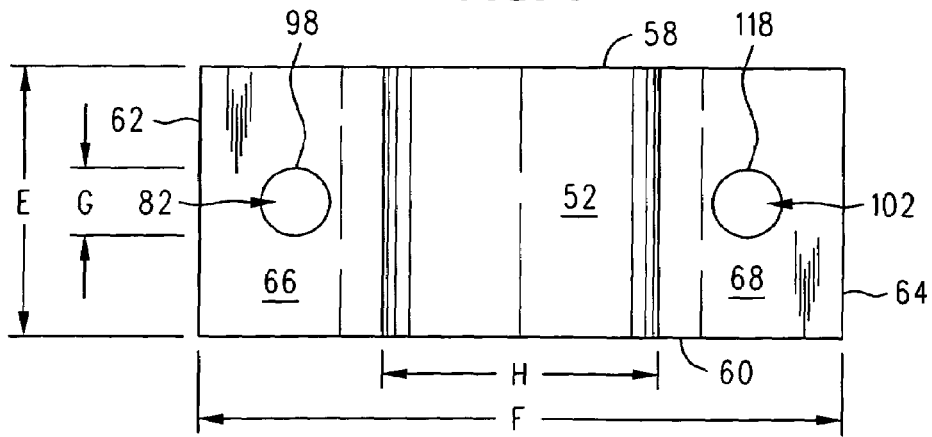
FIG. 5 is a bottom plan view illustrating the exemplary body portion of FIG. 3.
Figure 7:
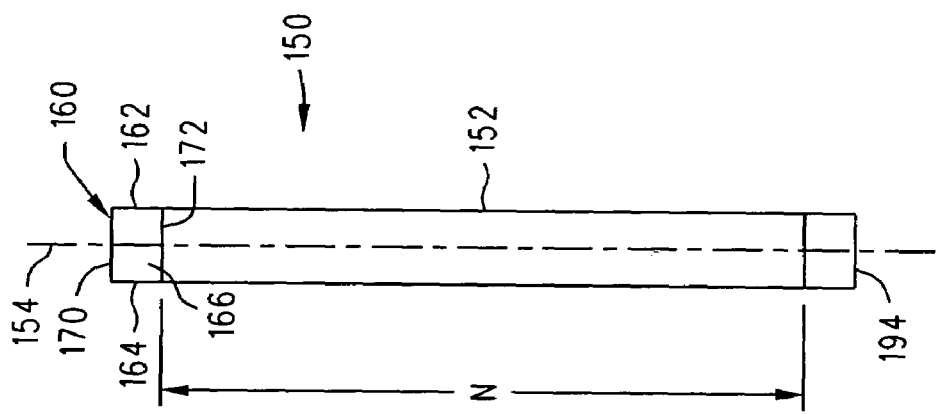
FIG. 7 is a side elevational view illustrating the exemplary nail of FIG. 6.

FIGS. 3-5 illustrate the body portion 50 of the fastener 10 in further detail. With reference, for example, to FIG. 4, body portion 50 may generally include a pair of leg members 80, 100 connected by a crown portion 120. With reference to FIG. 3, the leg members 80, 100 may be spaced from one another in a direction 106. As can be appreciated from FIG. 4, the leg members 80, 100 and the crown portion 120 together generally define an inverted U-shaped surface 52 surrounding an opening 54 in which the object secured by the fastener 10 may be located as will be explained in further detail herein. The opening 54 may have a width "H" (FIG. 5). The width "H" may, for example, be about 0.20 inch.

With further reference to FIGS. 2-4, body portion 50 may have an upper surface 56, a front surface 58 and an oppositely-disposed rear surface 60. Front surface 58 and rear surface 60 may, for example, be substantially parallel to one another and substantially perpendicular to the upper surface 56. A pair of oppositely-disposed side surfaces 62, 64 may extend between the front and rear surfaces 58, 60, as shown. Side surfaces 62, 64 may, for example, be substantially parallel to one another and be substantially perpendicular to the front and rear surfaces 58, 60 and to the upper surface 56. Each of the leg members 80, 100 may terminate in a lower surface 66, 68, respectively. The lower surfaces 66, 68 may, for example, be substantially parallel to the upper surface 56. The U-shaped surface 52 previously described may extend between the lower surfaces 66, 68, as shown.

Body portion 50 may, for example, have a height "D" (FIG. 4) of about 0.28 inch, a depth "E" (FIG. 5) of about 0.18 inch and a width "F" (FIG. 5) of about 0.43 inch.

With reference, for example, to FIG. 3, body portion 50 may include a pair of through-holes 82, 102, as shown. Through-hole 82 may extend from the upper surface 56 to the lower surface 66 of the leg member 80. Similarly, though hole 102 may extend from the upper surface 56 to the lower surface 68 of the leg member 100. Through-holes 82, 102 may be substantially identical to one another. Accordingly, only the through-hole 82 will be further described in detail herein, it being understood that the through-hole 102 may be formed in the same manner. In this regard, it is noted that FIG. 4 is shown in partial cross-section whereby the through-hole 82 is visible but the through-hole 102 is not.

With reference, for example to FIG. 4, the through-hole 82 may have a central longitudinal axis 84 which may, for example, extend substantially perpendicular to the upper surface 56 and substantially parallel to the side surface 62.

Through-hole 82 may include a first upper portion 86 having a cross-sectional size (see FIG. 3) at least large enough to accommodate the head 160 (e.g., FIGS. 6-9) of the nail 150 and the ram used to drive the nail during installation of the fastener (see, e.g., the ram portion 424 of the applicator tool 400, FIG. 19, as will be described in further detail herein).

Upper portion 86 may open to the upper surface 56 in, for example, a rectangular opening 88 and may extend downwardly from the upper surface 56 for a distance "A" which may, for example, be about 0.18 inch. It is noted that in the exemplary embodiment illustrated herein, the through-hole upper portion 86 is shown having a rectangular cross-section in a manner similar to the head 160 of the nail 150. The through-hole upper portion 86 and, thus the opening 88 could, however, alternatively have virtually any cross-sectional size and shape so long as the nail head and ram are accommodated.

Opening 88 may include a beveled or tapered portion 90, as shown, for example, in FIGS. 3 and 4. This tapered portion 90 may be provided to assist in guiding the hammer or ram of an installation tool during insertion of the fastener 10, in a manner as will be further described herein.

With reference to FIG. 3, opening 88 may have a length "B" which is greater than its width "C", thereby defining a central longitudinal axis 94. The length "B" may, for example, be about 0.09 inch and the width "C" may, for example be about 0.06 inch.

With reference to FIG. 4, the through-hole 102 of the leg member 100 may also define a central longitudinal axis 104, as shown. The leg member 80 central longitudinal axis 84 may be spaced from the leg member 100 central longitudinal axis 104 in the direction 106 (FIG. 3) which is transverse and, more preferably, perpendicular to the central longitudinal axis 94 of the rectangular opening 88. With reference to FIG. 4, the central longitudinal axes 84, 104 (and thus the leg members 80, 100) may be spaced from one another by a distance "O" which may, for example be about 0.31 inch.

Referring again to FIG. 4, through-hole 82 first portion 86 may terminate at its lower extremity at an upwardly facing shoulder surface 92. Shoulder surface 92 may, for example, be substantially parallel to the upper surface 56 and may have generally the same size and shape as the rectangular opening 88.

Through-hole 82 may include a second portion 96 extending downwardly from the shoulder surface 92 and terminating at the lower surface 66 in an opening 98. The opening 98 and the cross-section of the second portion 96 may, for example, be substantially circular, having a diameter "G" of about 0.05 inch. The through-hole 102 may terminate at the lower surface 68 in a similar opening 118.

With reference again to FIG. 1, as previously described, the fastener 10 may include a pair of nails 150, 250. Specifically, the nails 150, 250 may be at least partially located within the through-holes 82, 102, respectively, FIG. 3, of the body portion 50. The nails 150, 250 may be substantially identical to one another.

Accordingly, only the nail 150 will be further described in detail herein, it being understood that the nail 250 may be formed in the same manner. In this regard, in a manner similar to FIG. 4, FIG. 1 is shown in partial cross-section whereby the through-hole 82 and nail 150 are visible but the through-hole 102 and nail 250 are not.

Figure 6:
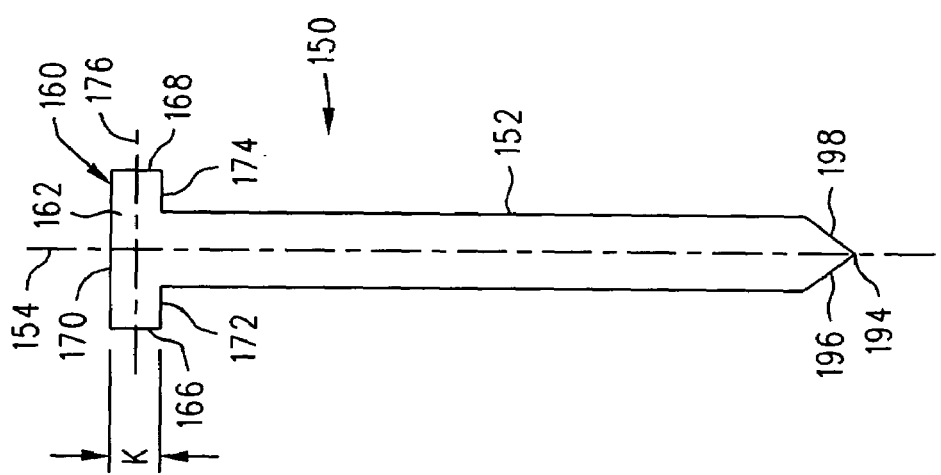
FIG. 6 is a front elevational view illustrating an exemplary nail used in conjunction with the fastener of FIG. 1.

FIGS. 6-9 illustrate the nail 150 in further detail. With reference, for example, to FIG. 6, the nail 150 may include an elongated shaft portion 152 having a central longitudinal axis 154. A head portion 160 may be formed at one end of the shaft portion 152, as shown. Head portion 160 may include a front surface 162 and an oppositely-disposed rear surface 164. Front surface 162 and rear surface 60 may, for example, be substantially parallel to one another. A pair of oppositely-disposed side surfaces 166, 168 may extend between the front and rear surfaces 162, 164, as shown. Side surfaces 166, 168 may, for example, be substantially parallel to one another and be substantially perpendicular to the front and rear surfaces 162, 164. An upper surface 170 may be formed as shown and may, for example, be substantially perpendicular to the front surface 162, rear surface 164 and side surfaces 166, 168. A pair of lower surfaces 172, 174 may be oppositely disposed and substantially parallel to the upper surface 170.

Figure 8:
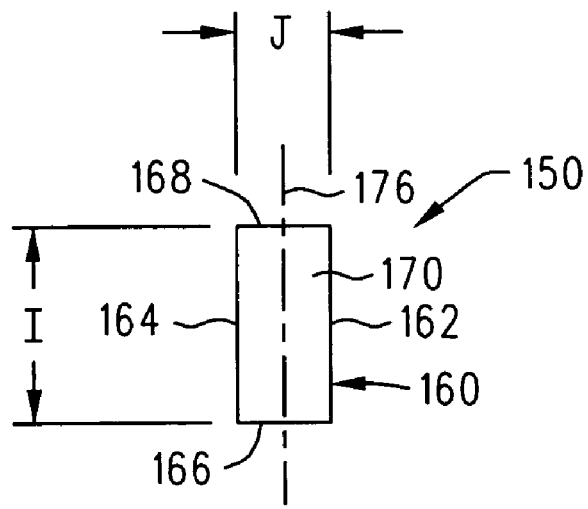
FIG. 8 is a top plan view illustrating the exemplary nail of FIG. 6.

With reference to FIG. 8, head portion 160 may have a length "I" which is greater than its width "J", thereby defining a central longitudinal axis 176. The length "I" may, for example, be about 0.09 inch and the width "J" may, for example be about 0.05 inch. With reference to FIG. 6, head portion 160 may have a height "K" of about 0.03 inch.

Figure 9:
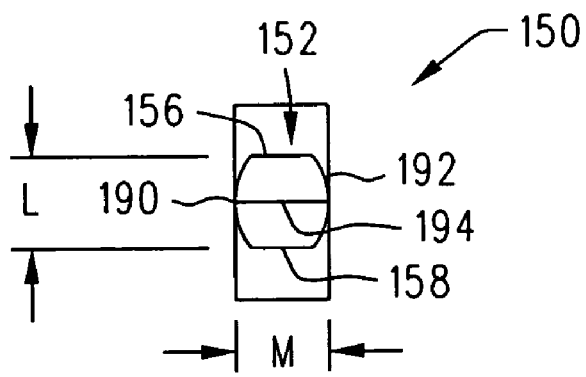
FIG. 9 is a bottom plan view illustrating the exemplary nail of FIG. 6.

With reference, for example, to FIG. 9, shaft portion 152 may include a pair of oppositely disposed surfaces 156, 158. Surfaces 156, 158 may, for example, each be substantially planar and be substantially parallel to one another. A pair of surfaces 190, 192 may extend between the surfaces 156, 158, as shown. Surfaces 190, 192 may, for example, each have a generally arcuate profile. The surfaces 156, 158 may be spaced a distance "L" from one another. The distance "L" may, for example, be about 0.04 inch. The surfaces 190, 192 may be spaced, at their greatest distance from one another, a distance "M". The distance "M" may be slightly larger than the diameter "G", FIG. 5, of the second portion 96 of the through-hole 82 such that the nail shaft portion 152 will have an interference or friction fit within the second portion 96, as will be explained in further detail herein. In the example set forth herein, the distance "M" may, for example, be about 0.05 inch.

The shaft 152, at its end opposite the head 160, may include an elongated point 194 to facilitate penetration of a substrate in a manner as generally described previously. Specifically, the surfaces 156, 158, may taper to the point 194 via a pair of angled surfaces 196, 198, as best shown in FIG. 6.

The shaft 152 may have an overall length "N" (FIG. 7) between the lower surfaces 172, 174 of the head portion 160 and the point 194 of the shaft 152. The central longitudinal axis 154 of the shaft portion 152 may, for example, be substantially perpendicular to the central longitudinal axis 176 of the head portion 160, FIG. 6. The nail 150 may be formed from any conventional material, e.g., steel.

FIGS. 1 and 2 illustrate the assembled fastener 10 in which the nails 150, 250 are inserted within the body portion 50 such that the fastener is ready for use. With reference to FIG. 1, it can be seen, for example, that the nail 150 is inserted within the through-hole 82 such that the upper surface 170 of the nail head 160 is substantially level with the upper surface 56 of the body portion 50. As can also be appreciated, the nail head lower surfaces 172, 174 are spaced from the upwardly facing shoulder surface 92 of the body portion through-hole 82. When inserted as shown in FIGS. 1 and 2, the central longitudinal axis 94 of the rectangular opening 88 (FIG. 3) will be parallel to and horizontally aligned with, the central longitudinal axis 176 of the nail head 160.

Figure 10:
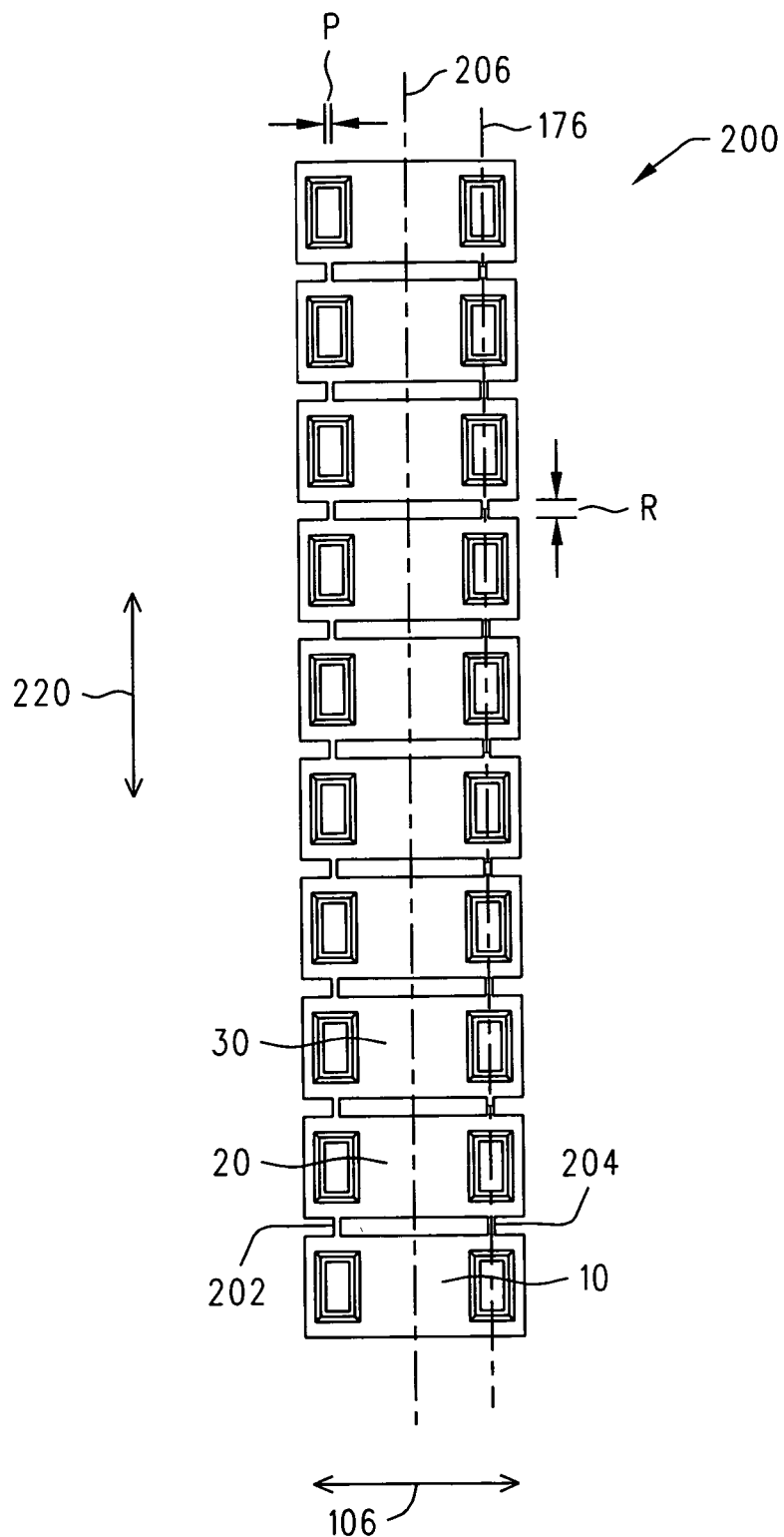
FIG. 10 is a top plan view illustrating an exemplary connected strip of fasteners.
Figure 11:
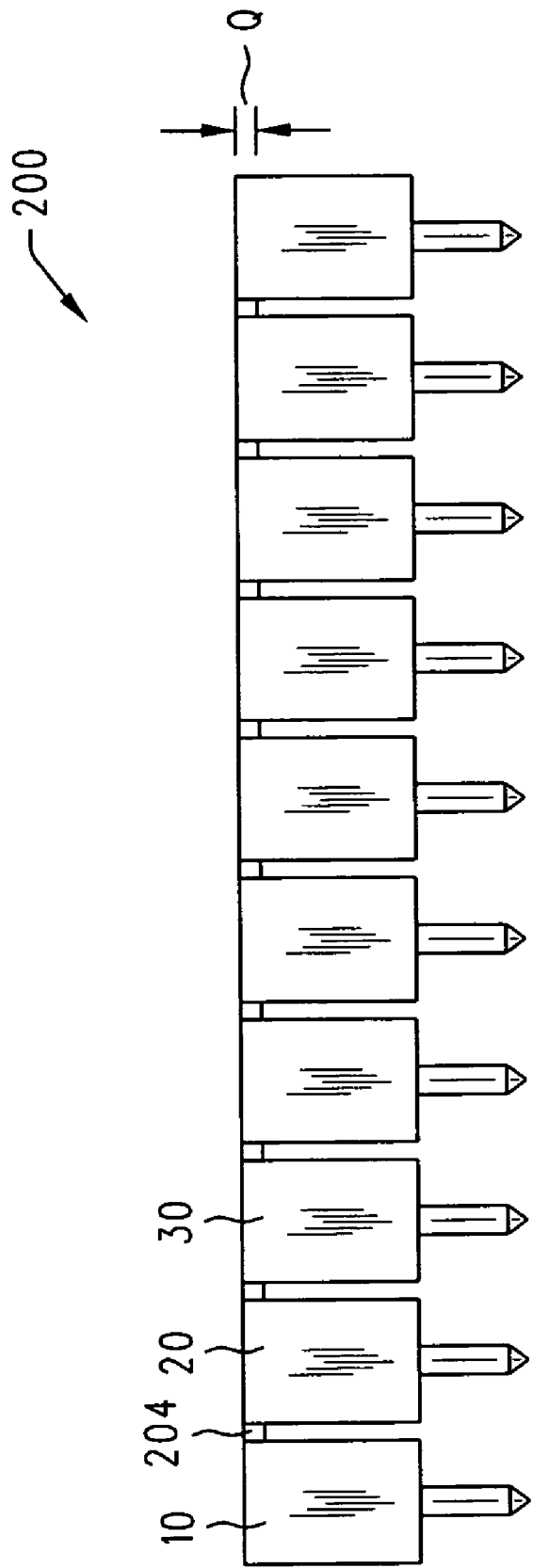
FIG. 11 is a side elevational view illustrating the exemplary strip of fasteners of FIG. 10.
Figure 12:
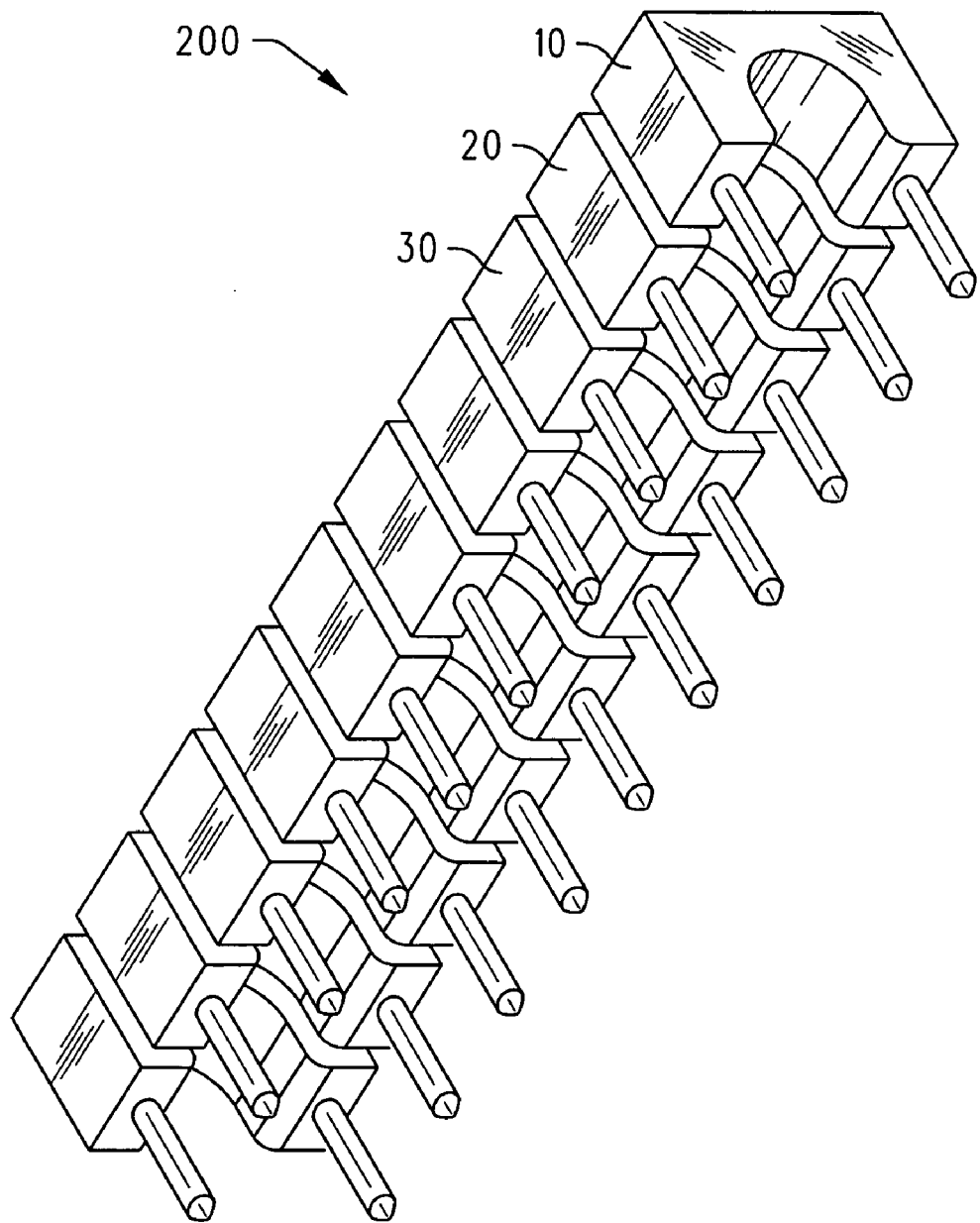
FIG. 12 is a bottom perspective view illustrating the exemplary strip of fasteners of FIG. 10.
Figure 13:
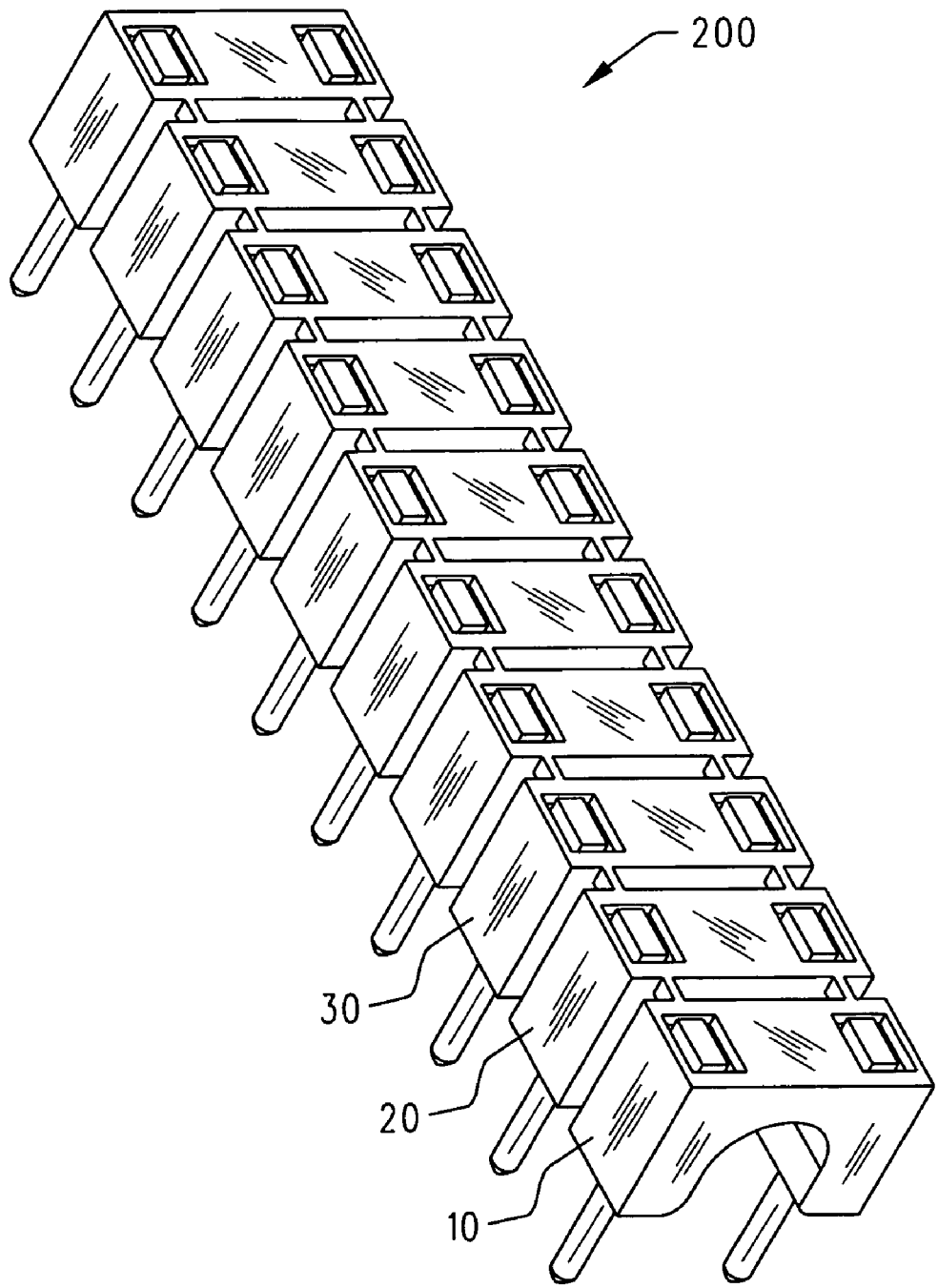
FIG. 13 is a top perspective view illustrating the exemplary strip of fasteners of FIG. 10.

FIGS. 10-13 illustrate a strip of fasteners 200 including a plurality of individual fasteners, e.g., the individual fasteners 10, 20 and 30, as shown. Each of the fasteners in the strip 200 may be substantially identical to the fastener 10 described previously in detail. The strip 200 may define a central longitudinal axis 206 extending in the direction 220, as illustrated in FIG. 10.

The fasteners in the strip 200 may be attached to one another via connecting portions, e.g., the connecting portions 202, 204, shown located between and connecting the fasteners 10 and 20. Each of connecting portions may, for example, have a width "P" (FIG. 10) of about 0.01 inch and a height "Q" (FIG. 11) of about 0.15 inch. Referring again to FIG. 10, the connecting portions may each also have a thickness "R" of about 0.04 inch; this distance also dictating the spacing between individual fasteners in the strip 200. It is noted that the connecting portions of the strip 200, e.g., the connecting portions 202, 204 are formed as shown for exemplary illustrative purposes only. The connecting portions could, alternatively, be formed having differing numbers, locations, shapes and/or dimensions.

Providing the fasteners in a connected strip, as shown, for example, in FIG. 10, enables simpler and less costly manufacture, relative to the manufacture of individual fasteners and it also facilitates handling of the fasteners and speeds their insertion into an installation device as will be described in further detail herein.

Figure 14:
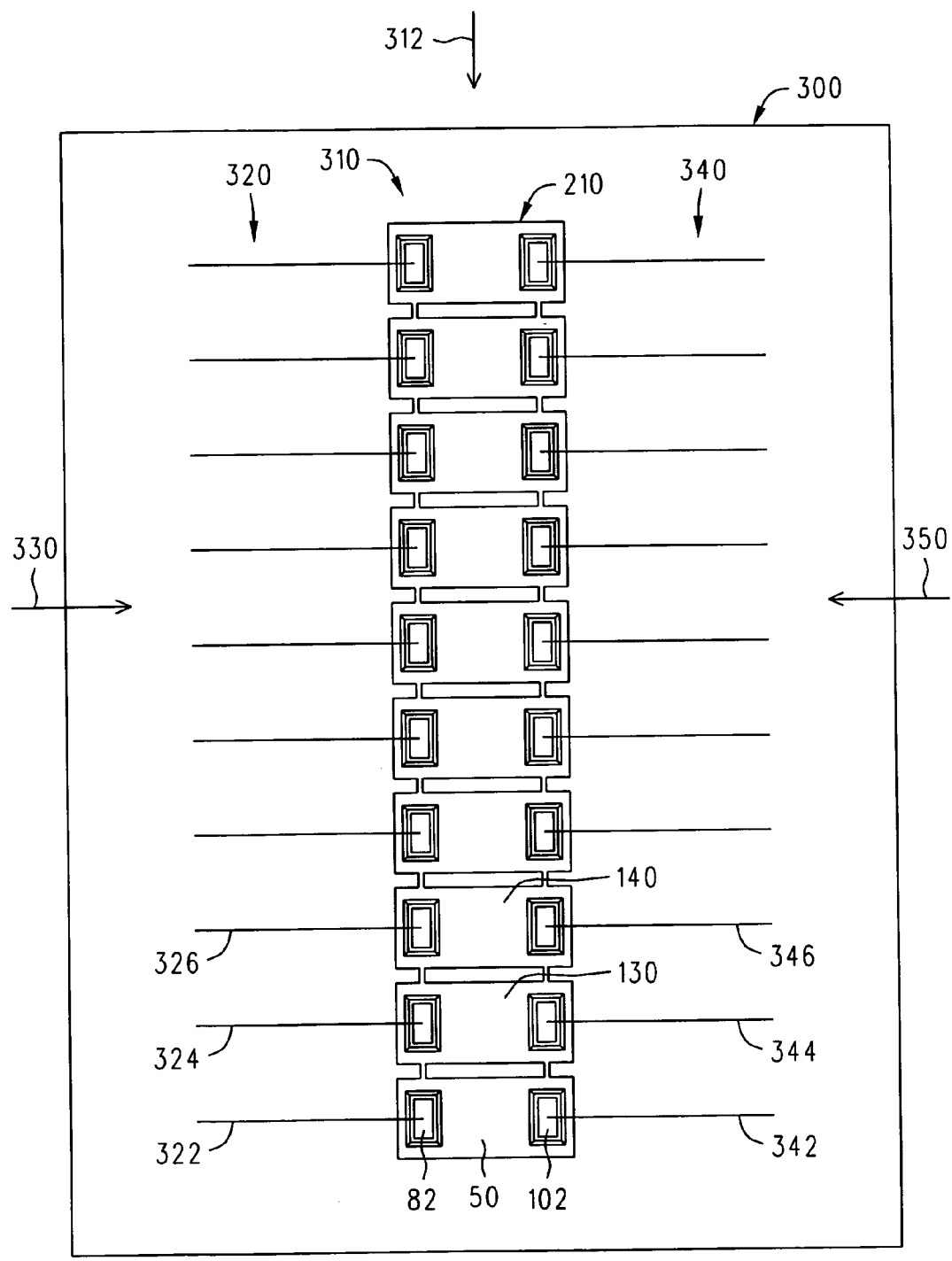
FIG. 14 is a top plan schematic view illustrating an exemplary system for manufacturing the strip of fasteners of FIG. 10.

To form the strip 200, a strip 210 of body portions, FIG. 14, may first be formed. The strip 210 of body portions may include a plurality of body portions such as the individual body portions 50, 130, 140. As can be appreciated, the strip 210 will include a number of body portions equal to the number of fasteners desired in the completed strip 200 of fasteners, FIGS. 10-13. The strip 210 may, for example, be made from any conventional material, e.g., plastic and may be formed in a conventional injection molding process. Accordingly, the individual body portions of each fastener (e.g., the body portion 50 of the fastener 10, FIG. 1) and the connecting portions (e.g., the connecting portions 202, 204, FIG. 10) may be simultaneously and integrally formed in a single process. Alternatively, the strip 210 may be formed using any other conventional process.

After the strip 210 of body portions is formed, it is converted into the strip of fasteners 200, as previously described by inserting a pair of nails into each fastener. In one exemplary embodiment, this conversion may be accomplished using a system 300 as schematically illustrated in FIG. 14. To insert the nails using the system 300, the strip 210 of body portions is first moved in the direction 312 into an operating station 310 of the system 300 to the position indicated in FIG. 14. The strip 210 may be moved in any conventional manner; according to one exemplary embodiment, however, it may be moved by an automated conveying mechanism as will readily be understood by one skilled in the art.

A plurality of nail strips are located at the station 310. When the strip 210 of body portions is located within the station 310, it will be positioned between a first group 320 of nail strips and a second group 340 of nail strips, as shown. The first group 320 may include a plurality of individual nail strips such as the individual nail strips 322, 324, 326. In a similar manner, the second group 340 may include a plurality of individual nail strips such as the individual nail strips 342, 344, 346.

Figure 15:
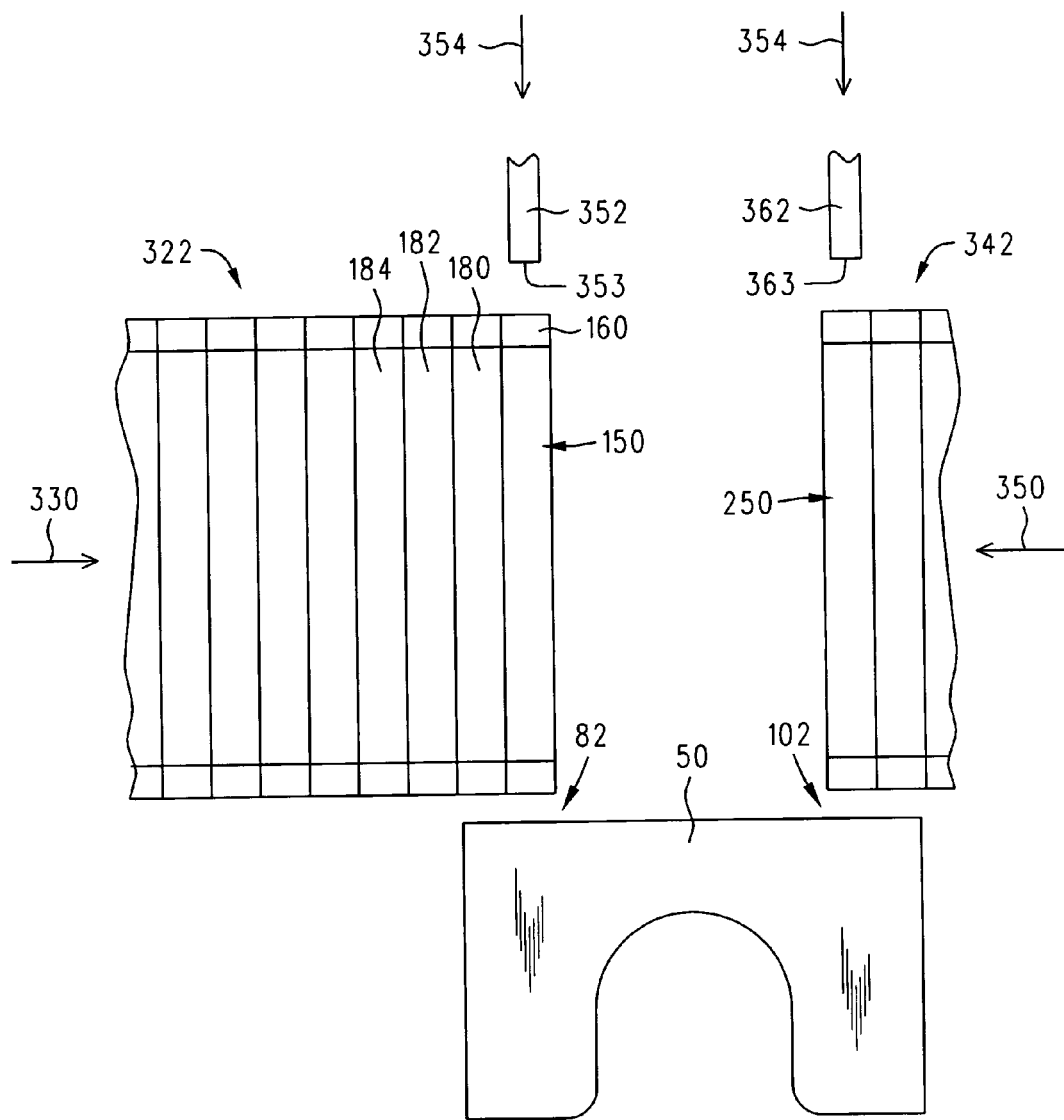
FIG. 15 is a front elevational schematic view illustrating the exemplary system of FIG. 14 in a first operating condition.

FIG. 15 illustrates the nail strips 322 and 324 in further detail, it being understood that the remaining nail strips may be configured in a substantially identical manner. Referring now to FIG. 15, the nail strip 322 may include a plurality of individual nails, such as the individual nails 150, 180, 182, 184. All of the nails in the strip may be configured in a substantially identical manner to the nail 150 described in detail previously herein. The nails may be adhered, e.g., by glue, to one another to form the strip 322 in a conventional manner.

With reference again to FIG. 14, during operation of the system 300, the individual nail strips in the group 320, are advanced in the direction 330. In a similar manner, the individual nail strips in the group 340 are advanced in the direction 350. To facilitate this movement, the nail strips may be conveyed by conventional in-line conveying equipment in a manner that will be understood by a person skilled in the art.

Continuing with the description of the operation of the system 300, after the strip 210 of body portions is moved into the station 310, the nail strips within the group 320 are advanced in the direction 330 by a distance equal to the thickness of one nail, i.e., the dimension "J", FIG. 8. This movement causes the outermost nail in each of the strips of nails in the group 320 (e.g., the nail 150, FIGS. 1-2) to overlie one of the through-holes of the adjacent body portion of the strip 210 (e.g. the through-hole 82 of the body portion 50, FIGS. 3-5). At the same time that the nail strips in the group 320 are being moved, the nail strips within the group 340 are advanced in the direction 350 by a distance equal to the thickness of one nail, i.e., the dimension "J", FIG. 8. This movement causes the outermost nail in each of the strips of nails in the group 340 (e.g., the nail 250, FIGS. 1-2) to overlie one of the through-holes of the adjacent body portion of the strip 210 (e.g. the through-hole 102 of the body portion 50, FIGS. 3-5).

Figure 16:
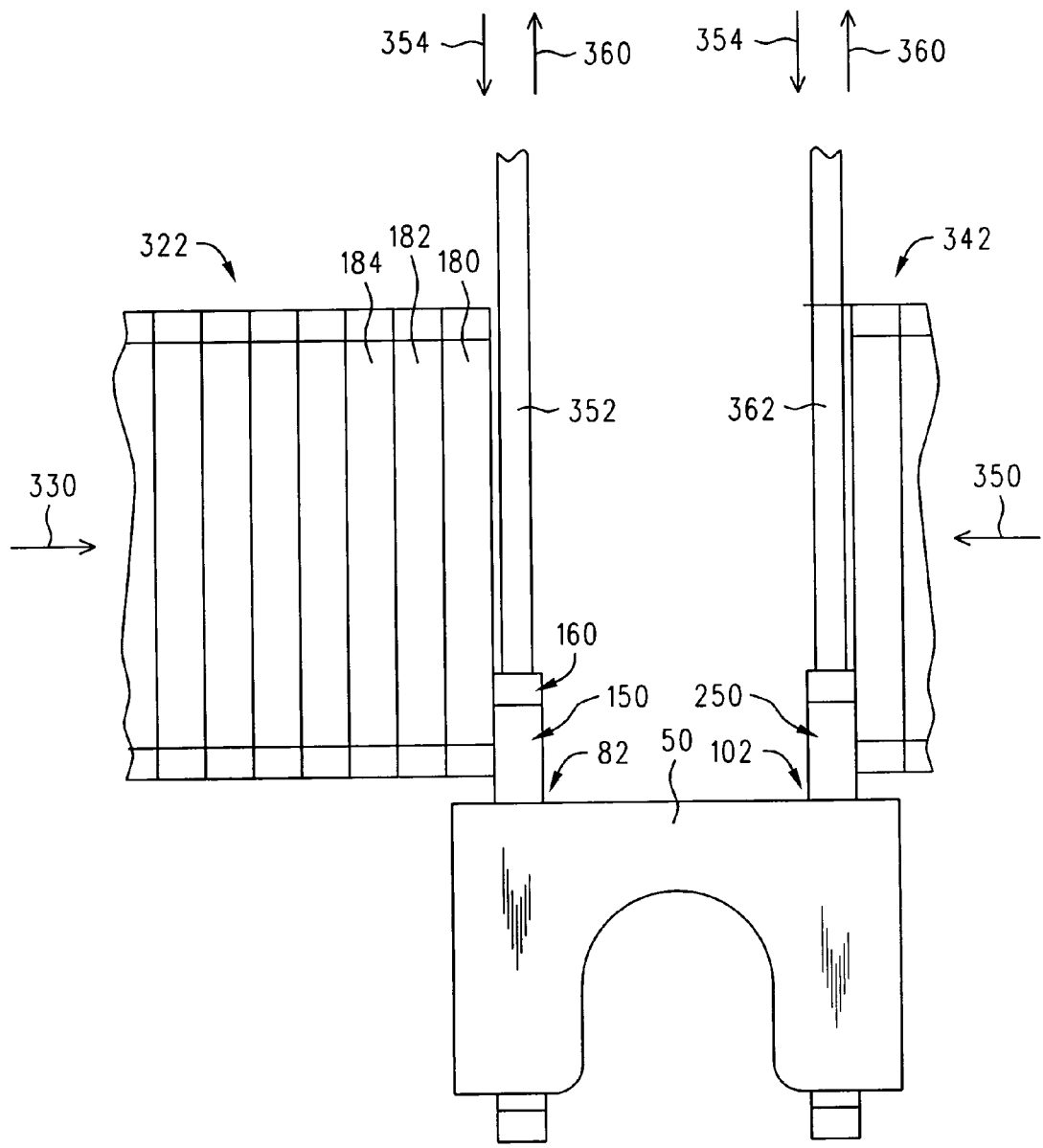
FIG. 16 is a front elevational schematic view, similar to FIG. 15, but illustrating the exemplary system of FIG. 14 in a second operating condition.

With reference to FIGS. 15 and 16, a plunger 352 may be associated with the group 320 of nail strips and a plunger 362 with the group 340, as shown. After the nails are advanced, as discussed above, the plungers 352, 362 then move downwardly to insert the outermost nail in each strip into the underlying through-hole of the strip 210 in a conventional manner; specifically, the plunger 352 contacts the outermost nails in the group 320 of nail strips and the plunger 362 contacts the outermost nails in the group 340 of nail strips.

It is noted that two plungers (i.e., 352, 362) are shown and described herein for exemplary illustrative purposes only. Alternatively, a different number of plungers could readily be used. For example, a separate plunger could be provided for each nail strip (resulting in a total of twenty plungers in the example illustrated in FIG. 14) or a single plunger could be provided for all of the nail strips (i.e., for both of the groups 320, 340).

FIG. 15 illustrates the condition in which the nails strips have advanced the distance "j", as described above, such that the outermost nail in each of the strips of nails in the groups 340, 350 overlie one of the through-holes of the adjacent body portion of the strip 210. In FIG. 15, it can be seen, for example, that the nail strip 322 has moved in the direction 330 such that the outermost nail 150 now lies above the through-hole 82 in the body portion 50 and that the nail strip 342 has moved in the direction 350 such that the outermost nail 250 now lies above the through-hole 102 in the body portion 50. In this position, as can be seen from FIG. 15, the outermost nails 150 and 250 also have moved beneath plungers 352, 354, respectively.

After the nail strips have advanced to the position shown in FIG. 15, the plungers move downwardly, i.e., in the direction 354, until the lower surface of each plunger contacts the head of each outermost nail. With reference to FIG. 15, for example, the lower surface 353 of the plunger 352 would contact the head 160 of the nail 150 and the lower surface 363 of the plunger 354 would contact the head of the nail 250.

Continued downward movement of the plungers causes the outermost nail in each strip to separate from its respective nail strip and move downwardly into the through-hole of the body portion beneath it.

FIG. 16 illustrates a condition in which the plungers have partially inserted the outermost nails into their underlying through-holes. As can be seen in FIG. 16, the plungers 352, 362, for example, have partially inserted the nails 150, 250 into the underlying through-holes 82, 102, respectively, of the body portion 50.

The plungers continue to move downwardly until the nails each reach their fully-inserted positions. Note, for example, the fully inserted position illustrated in FIG. 1 in which the upper surface 170 of the nail head 160 is substantially flush with the upper surface 56 of the body portion 50.

Thus, the strip of body portions 210 has now been completely converted into the fully-formed strip of fasteners 200 and is ready for use. It is noted that the nails may be held in their fully-inserted position due to a friction fit between the shaft portions of the nails (e.g. the shaft portion 152 of the nail 150) and the through-hole second portions (e.g., the second portion 92 of the through-hole 82).

At this point, the plungers are retracted in the upward direction 360, e.g., FIG. 16, until they again reach the fully-retracted position shown in FIG. 15. The completed strip of fasteners 200 may then be moved out of the operating station 310 in the direction 312, FIG. 14, and the next strip of body portions moved into place and the cycle repeated to form the next strip of fasteners.

As can be appreciated from the preceding description, the system 300 is able to install all of the nails into the strip of body portions 210 simultaneously. This allows the strip 210 to be converted into the finished strip 200 of fasteners in a single step and results in an extremely efficient manufacturing operation with lower product handling requirements relative to conventional methods. Further, using nail strips eliminates the need to handle individual nails and further contributes to the efficiency of the system.

It is noted that the strip 200 is illustrated having ten individual fasteners for exemplary purposes only. The strip could, alternatively, have any desired number of fasteners. It is, of course, necessary to adjust the number of nail strips in the system 300 to correspond to the number body portions in the strip.

As can further be appreciated from the above (and with reference to FIG. 10), the system 300 yields a strip of fasteners 200 in which individual fasteners in the strip 200 are spaced from one another in a direction 220 which is transverse, and more preferably, perpendicular, to the direction 106 in which the leg members of the individual fastener body portions (e.g., the leg members 80, 100 of the body portion 50, FIG. 4) are spaced. The system further dictates that, in the strip 200, the central longitudinal axes of the nail heads in the strip (e.g. the central longitudinal axis 176, FIGS. 8 and 10) are also transverse and more preferably, perpendicular to the direction 106 in which the leg members of the individual fastener body portions are spaced.

Figure 17:
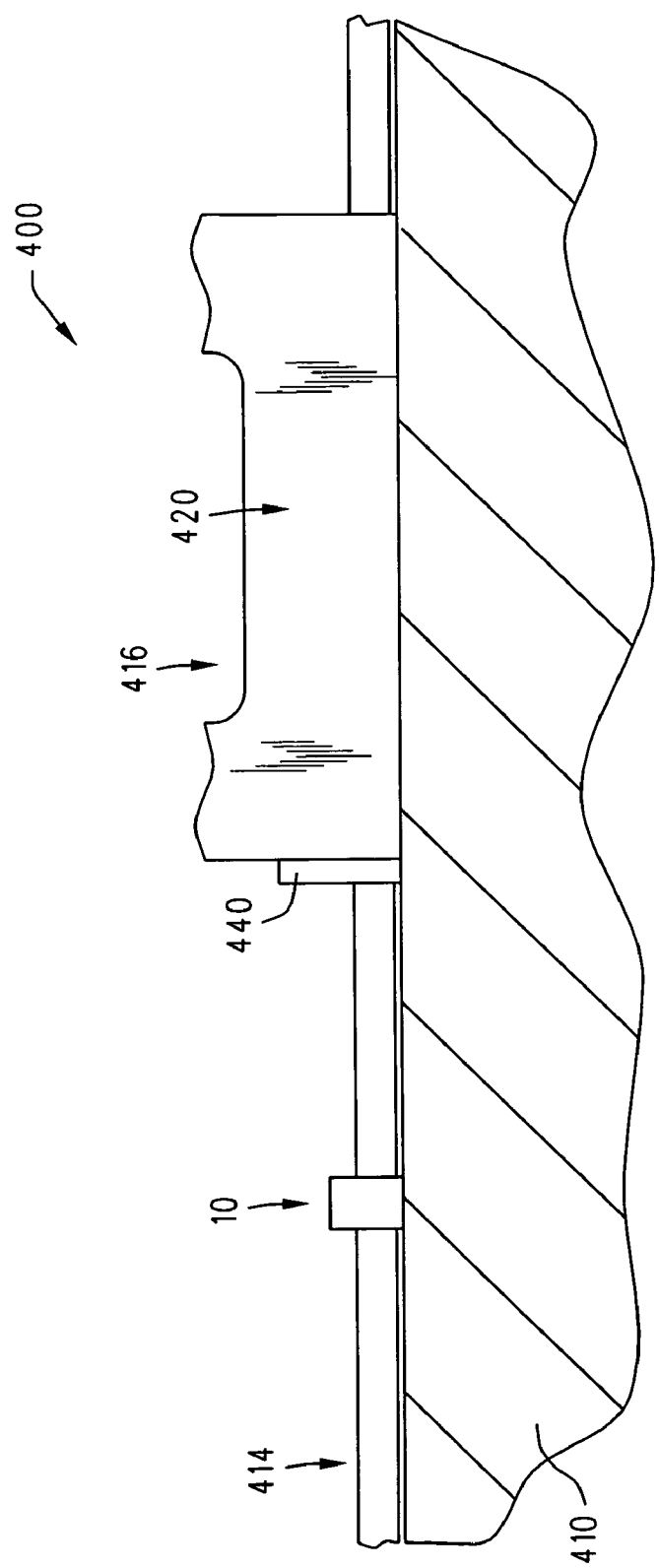
FIG. 17 is a front elevational, part cross-sectional, schematic view illustrating an exemplary applicator device for installing fasteners.

A portion of an applicator tool 400 is schematically illustrated in FIG. 17. Applicator tool 400 may be used to install fasteners, such as those previously described herein, into a substrate 410. FIG. 17 illustrates an exemplary situation in which the applicator tool 400 has already been used to attach at least one fastener 412 within the substrate 410 and is in position to attach another. The fasteners may, for example, be used to secure a cylindrical object, for example a cable 414, relative to the substrate 410.

Figure 18:
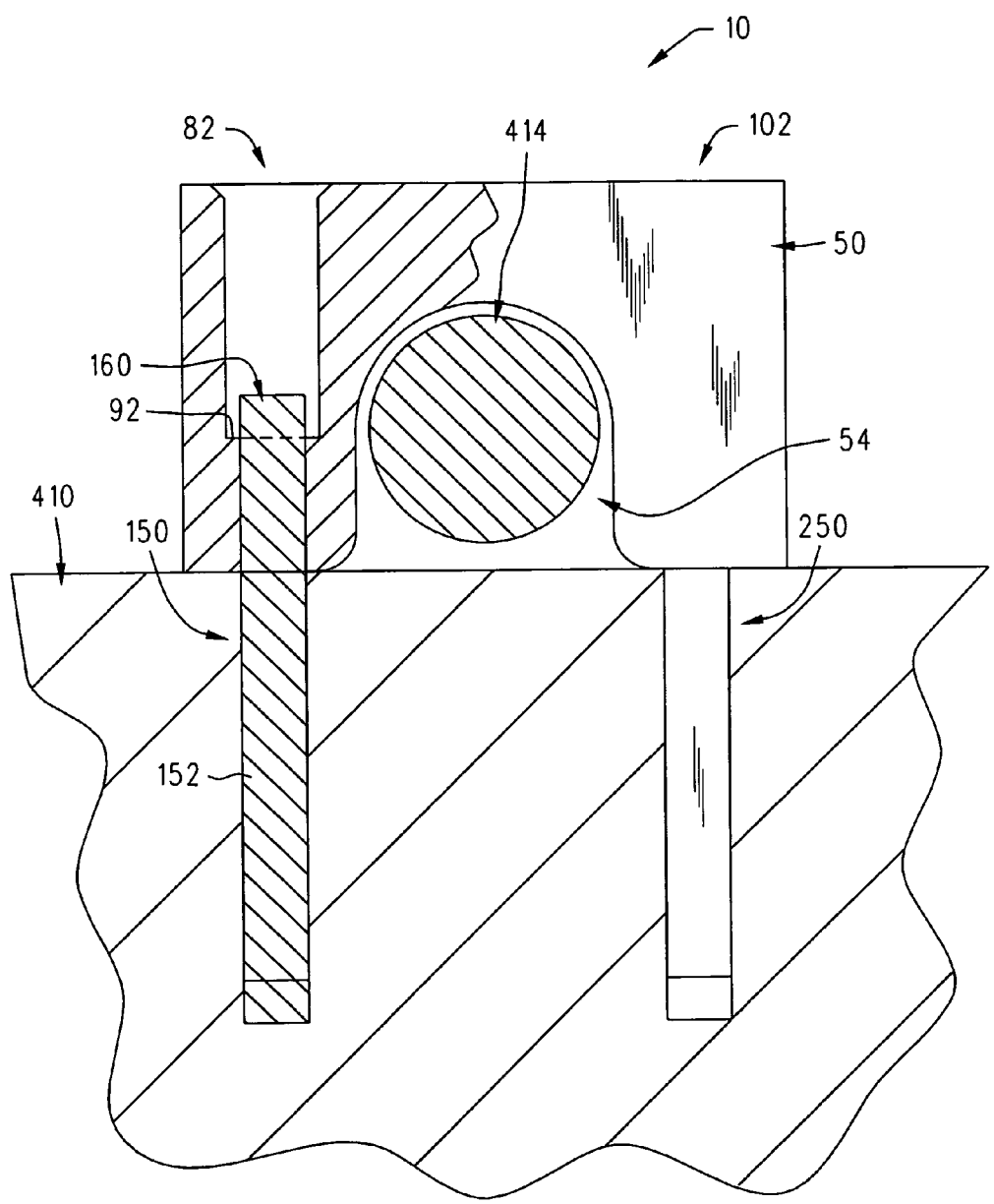
FIG. 18 is a front elevational, part cross-sectional view illustrating the exemplary fastener of FIG. 1 in an installed condition.

FIG. 18 shows further detail of the installed fastener 10 of FIG. 17. In a manner similar to FIGS. 1 and 4, FIG. 18 is shown in partial cross-section whereby the through-hole 82 and nail 150 are visible but the through-hole 102 and the portion of nail 250 located therein are not.

As can be appreciated from FIG. 18, the cable 414 may be located within the central opening 54 of the fastener and the nails 150, 250 may be embedded in the substrate 410. Specifically, with reference, for example, to the nail 150, the head portion 160 (i.e., the lower surfaces 172, 174, FIG. 6) of the nail 150 may be abutting the upwardly facing shoulder surface 92 of the through-hole 82 of the body portion 50. In this manner, the nails 150, 250 securely attach the fastener 10 to the substrate 410.

Referring again to FIG. 17, the applicator tool 400 may generally include a housing 416 including a lower support section 420 and an upper reciprocal mechanism, not shown. Except for the modification discussed below, the applicator tool 400 may be a conventional applicator tool and may, for example, be of the type substantially as shown in U.S. Pat. No. 6,481,612 of Mangone, Jr. for FASTENING DEVICE DELIVERY TOOL WITH PERPENDICULAR RAM DRIVEN BY A REPEATABLE ARCUATE FORCE MEMBER, which is hereby incorporated by reference for all that is disclosed therein. In this type of applicator, a pair of reciprocal ram portions repeatedly strike the nails of the fastener to install the fastener into a substrate.

Figure 19:
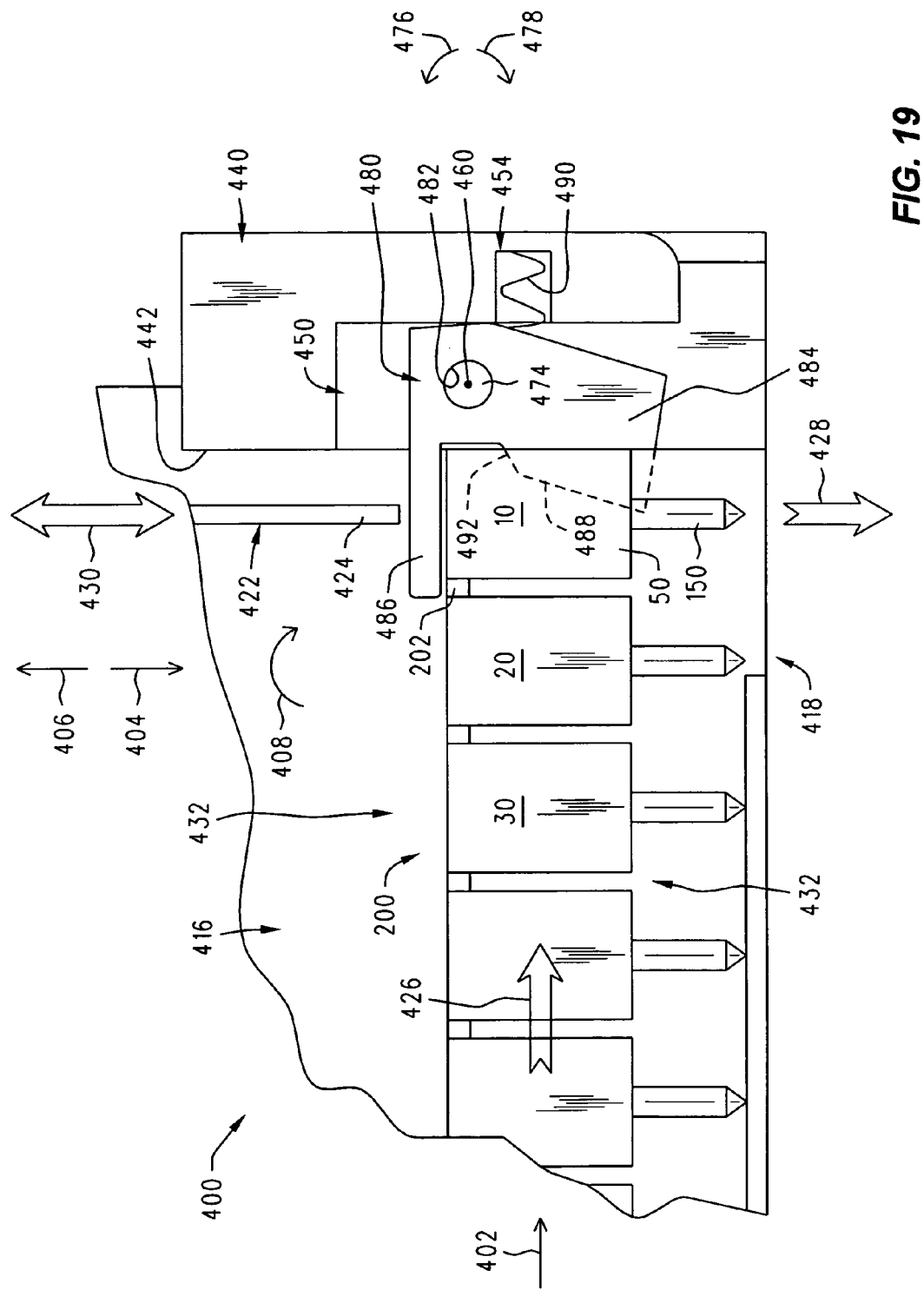
FIG. 19 is a rear elevational schematic view illustrating further details of the exemplary applicator device shown in FIG. 17.

FIG. 19 schematically illustrates a portion of the housing 416 of the applicator tool 400. Housing 416 may include a chamber 432 formed therewithin for holding a plurality of fasteners, e.g., the strip 200 of fasteners shown. An opening 418 in the housing 416 communicates with the chamber 432 and provides for passage of a fastener during installation, as will be further described herein. A spring mechanism (not shown) may be provided in the housing 416 to urge the strip 200 in the direction 402 in a conventional manner. As can be appreciated, this results in the fastener 10 being pressed against a rear surface 442 of the front plate 440. In a conventional manner, a ram 422 may be reciprocally moveable in the directions 404, 406 along a ram movement path as generally indicated by the arrow 430. The ram 422 may include first and second portions (only the first portion 424 is visible in FIG. 19), each of which are spaced to contact one of the nailheads of the fastener which is in the forward-most position occupied by the fastener 10 in the illustration of FIG. 19.

In general terms, during operation of the applicator tool 400, the strip 200 of fasteners is first loaded into the chamber 432 in the direction 402 along a first movement path as generally indicated by the arrow 426. After the fasteners are loaded, the spring mechanism discussed above urges the strip 200 in the direction 402. When the first fastener 10 in the strip is to be installed, it is separated from the next fastener 20 and moved downwardly by downward movement (i.e., the direction 404 in FIG. 19) of the ram 422. Thus, during installation of the first fastener 10, the fastener moves along a second movement path which begins in the position occupied by the first fastener 10 in FIG. 19 and extends downwardly through the opening 418 in a manner generally indicated by the arrow 428. After the first fastener 10 is installed, the remaining fasteners in the strip 200 move forward along the first movement path 426 until the next fastener 20 is pressed against the rear surface 442 of the front plate 440 and the process may be repeated. As can be appreciated, the second movement path 428 may be generally parallel to and aligned with the ram movement path 430. Further, the first movement path 426 may be transverse, and more preferably, perpendicular to the second movement path 428.

Having generally discussed the operation of the applicator tool 400 above, its operation will now be described in further detail. When a fastener is to be inserted by the applicator tool 400, the ram 422 moves downwardly until its first and second portions contact and apply downward force to the nail heads of the forward-most fastener 10. This downward force, in turn, causes the nails 150, 250 to move downwardly, i.e., in the direction 404. As previously described, there is a friction fit between the shaft portions of the nails (e.g. the shaft portion 152 of the nail 150) and the through-hole second portions (e.g., the second portion 92 of the through-hole 82). Depending upon the degree of friction fit, the body portion may or may not move with each movement of the nails. If, however, the body portion does not initially move along with the nails, it will begin to do so once the nail heads reach the upwardly facing shoulders (e.g., 92 in FIG. 18) of the body portion through-holes. Downward movement of the body portion 50, in turn, causes the connecting portion 202 to break, thus separating the fastener 10 from the remainder of the fasteners in the strip 200.

The ram 422 continues to drive the nails downwardly until a fully-inserted condition is reached in which the body portion 50 contacts the substrate 410 and the nails are fully inserted into the substrate 410, as illustrated in FIG. 18. It is noted that the above insertion process is typically accomplished via multiple hits of the ram 422 thus causing the nails 150, 250 to move incrementally downwardly with each hit of the ram.

A problem has been discovered when using a conventional applicator to insert fasteners of the type described herein. Specifically, a condition can be reached during the insertion process in which the connecting portion 202 has broken and the forward-most fastener 10 has moved downwardly a small distance but still requires further hits from the ram to complete the process. In this case, the next fastener 20 sometimes tends to move forward (i.e., in the direction 402) and/or twists in the direction 408 causing a portion of the fastener 20 to overlie a portion of the partially-inserted fastener 10. This, in turn, sometimes results in the ram portions (e.g., 424, FIG. 19) contacting the overlying portion of the second fastener 20 rather than the nail heads of the fastener 10 on the next downstroke of the ram 422 and can result in a jam.

Figure 20:
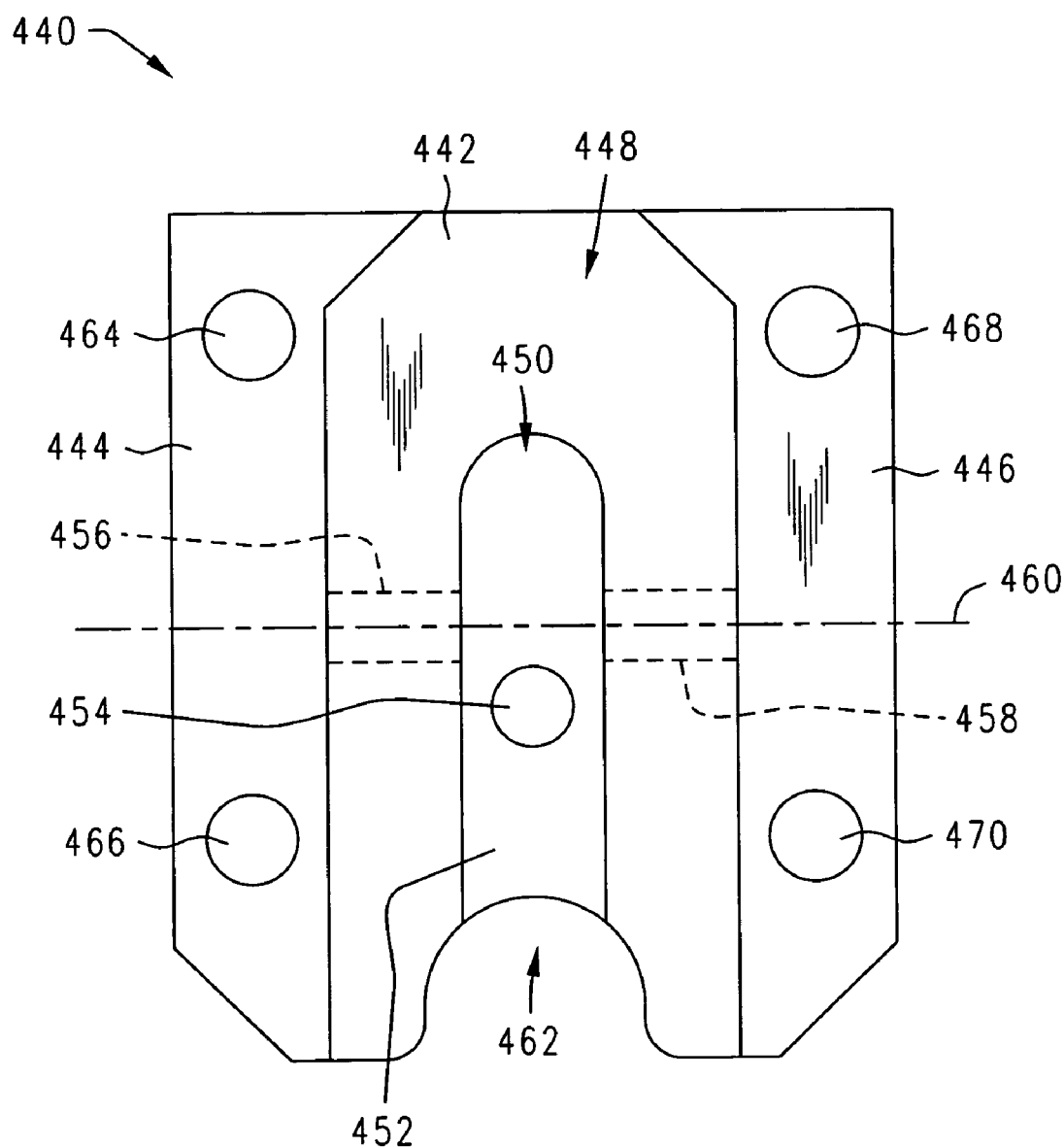
FIG. 20 is a front elevational view illustrating an exemplary front plate portion of the exemplary applicator device shown in FIG. 17.

To address this problem, a modified front plate 440 is provided as will now be described in detail. With reference to FIG. 20, the front plate 440 may include a pair of relatively lower surfaces 444, 446, as shown. A raised portion 448 extends from the lower surfaces 444, 446 and terminates at the rear surface 442, previously discussed with respect to FIG. 19. An elongated slot 450 may be formed in the raised portion 448. A blind hole 454 may be formed in the bottom surface 452 of the slot 450. A pair of through-holes 456, 458 may be formed in the raised portion 448 and may each extend from and open to one side of the raised portion 448 and the elongated slot 450. The through-holes 456, 458 may each be substantially circular in cross section and be coaxial with one another about an axis 460.

A generally U-shaped opening 462 may extend completely through the front plate 440 for the purpose of providing clearance for a cable (e.g., the cable 414, FIG. 17) or other member being attached by the applicator tool 400 during use. A plurality of through-holes 464, 466 and 468, 470 may extend through the front plate 440 from the lower surfaces 444, 446, respectively.

Referring again to FIG. 19, a pivot member 480 may be located partially within the elongated slot 450 and pivotally mounted to the remainder of the front plate 440. The pivot member 480 may include a lower portion 484 and an upper portion 486. Lower portion 484 may include a generally rearwardly facing surface 488 and a cam surface 492, as shown.

To pivotally mount the pivot member 480, a pin 474, FIG. 19, may be driven through the through-hole 458, FIG. 20, a through-hole 482 in the pivot member 480, FIG. 19 and the through-hole 456, FIG. 20. In this manner, the pivot member 480 is able to pivot relative to the remainder of the front plate 440 in the directions 476, 478, FIG. 19.

A compression spring 490 may be mounted in the blind hole 454 and contact the lower portion 484 of the pivot member 480 to bias the pivot member in the direction 478 toward the fully-retracted position shown in FIG. 19.

In operation, the pivot member serves to prevent the next fastener 20 from moving forward along the first movement path 426 and overlying a portion of the partially inserted fastener 10, as discussed above.

FIG. 19 schematically illustrates a starting condition before the ram 422 has contacted the fastener 10. As can be seen, the pivot member 480 is positioned such that the pivot member lower portion 484 is within the second movement path 428 and the pivot member upper portion 486 is not within the first movement path 426.

Figure 21:
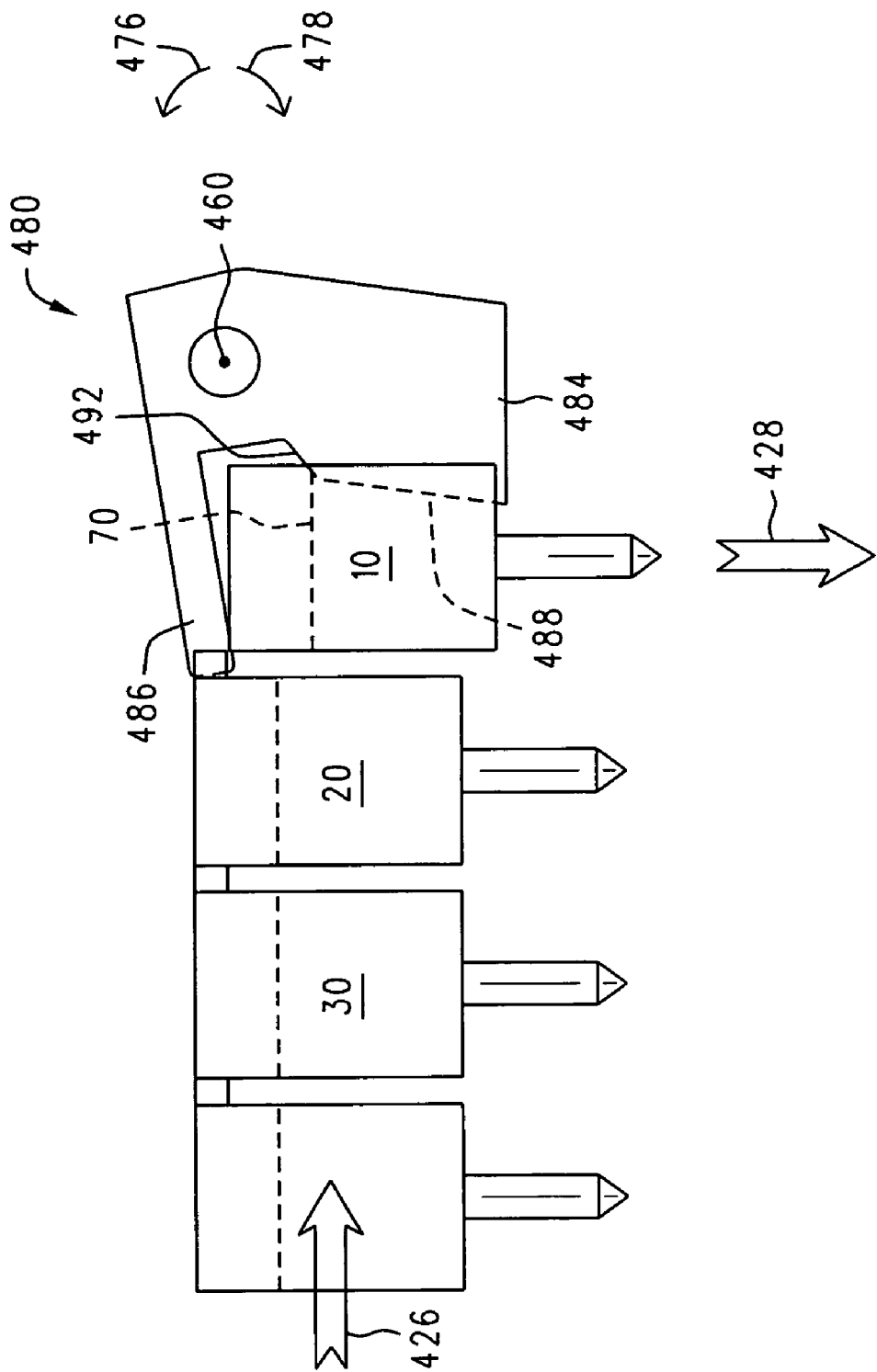
FIG. 21 is a front elevational view schematically illustrating a portion of the exemplary applicator device of FIG. 17 in a first operating condition.

FIG. 21 schematically illustrates a condition in which the connecting portion 202 has been broken and the fastener 10 has moved downwardly along the movement path 428 a small distance. This movement of the fastener 10 has caused an upper portion 70 of the body portion surface 52 (FIGS. 4 and 5) to contact the cam surface 492 of the pivot member 480, thus causing the pivot member 480 to pivot a small distance in the direction 476. This pivoting, in turn, causes the pivot member upper portion 486 to move into the movement path 426 and, thus, into the path of the next fastener 20, as shown.

Figure 22:
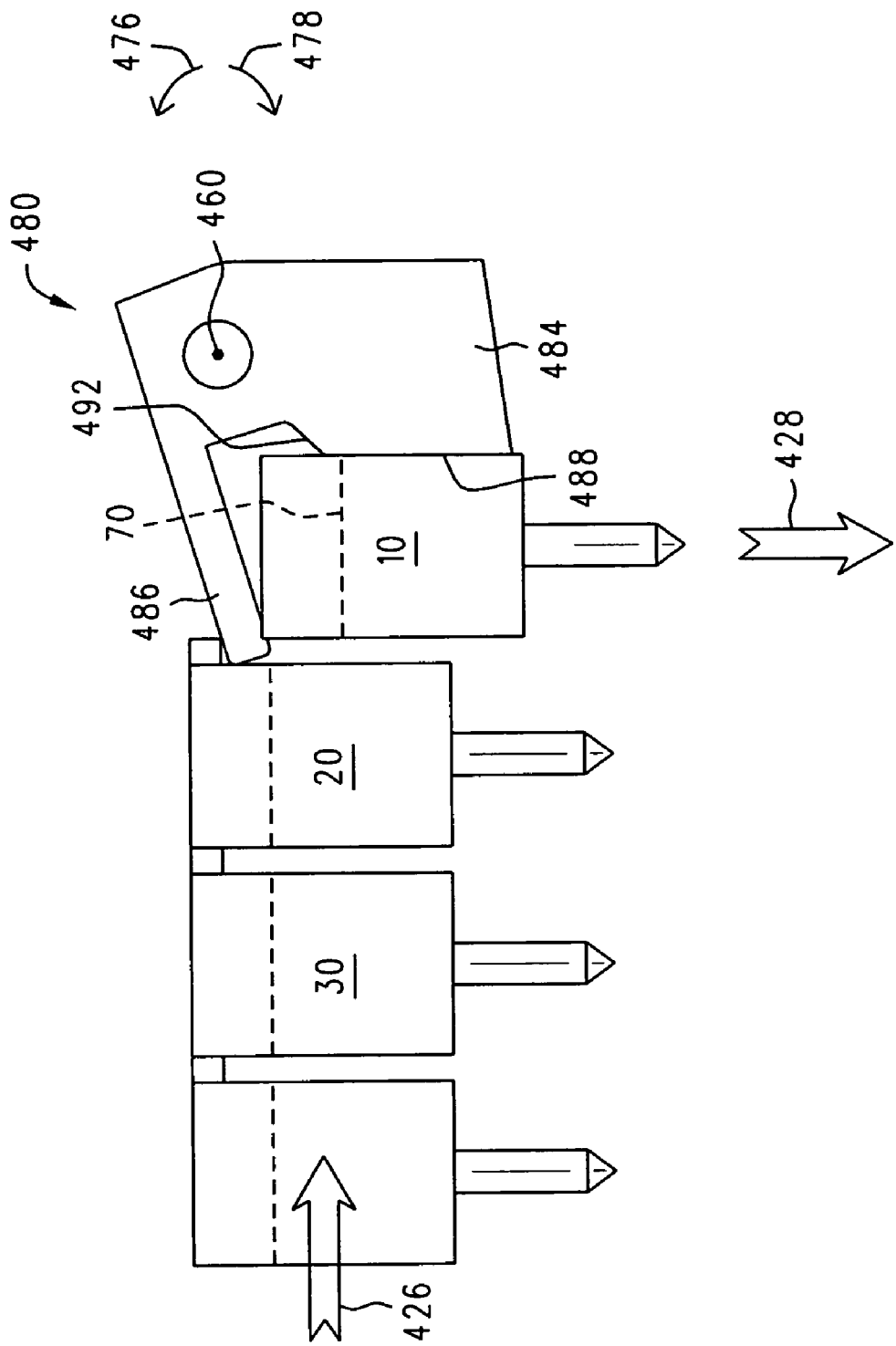
FIG. 22 is a front elevational schematic view, similar to FIG. 21, but illustrating the portion of the exemplary applicator device of FIG. 17 in a second operating condition.

FIG. 22 schematically illustrates a condition in which the fastener 10 has moved further downwardly along the movement path 428 relative to the position illustrated in FIG. 21.

This further downward movement of the fastener 10 has caused the pivot member 480 to pivot further in the direction 476. The pivot member upper portion 486 has moved further into the movement path 426. The upper portion 70 of the fastener 10 has now passed beyond the end of the cam surface 492 and the pivot member 480 has, thus, rotated further in the direction 476. At this point, the pivot member lower portion 484 is being held out of the second movement path 428 due to contact between the lower portion 484 and the fastener crown portion 120 (FIG. 4) as the fastener 10 continues to move downwardly along the second movement path 428. The upper portion 486 of the pivot member 480 has now moved further into the first movement path 426 and is in a position in which it will substantially block forward movement of the next fastener 20 along the first movement path 426, as can be appreciated from FIG. 22.

The fastener 10 will continue to move downwardly along the second movement path 428 until it completely clears the lower portion 484 of the pivot member 480. At this point, the spring 490, FIG. 19, causes the pivot member 480 to rotate in the direction 478 back to the retracted position shown in FIG. 19. At this point, the pivot member first portion 486 has moved out of the first movement path 426 of the fasteners and the next fastener 20 is able to move forward along the movement path 426 into position for insertion.

As can be appreciated from the above, the modified front plate 440, including the pivot member 480, prevents the next fastener 20 from advancing until the forward-most fastener 10 has completed the attachment process. This, in turn, allows multiple hits of the ram to occur, and prevents undesirable jams.

While illustrative and presently preferred embodiments have been described in detail herein, it is to be understood that the inventive concepts may be otherwise variously embodied and employed and that the appended claims are intended to be construed to include such variations except insofar as limited by the prior art.

What is claimed is:

1. A method comprising:
   providing a tool comprising:
     a housing
     a chamber within said housing, said chamber capable of holding a plurality of fasteners, said chamber defining therewithin a movement path along which fasteners can move in a first direction;
     a pivot member pivotally mounted to said housing about a pivot axis and at least partially located within said chamber, said pivot member comprising first and second portions;
   providing a plurality of fasteners within said chamber, said plurality of fasteners comprising a first fastener and an adjacent second fastener;
   causing movement of said first fastener relative to said second fastener in a second direction;
   wherein said movement of said first fastener in said second direction causes forcible engagement between said first fastener and said pivot member first portion;
   wherein said forcible engagement between said first fastener and said pivot member first portion causes pivoting of said pivot member about said pivot axis;
   wherein said pivoting of said pivot member causes said pivot member second portion to enter said movement path.

2. The method of claim 1 and further wherein:
said pivot member second portion entering said movement path limits movement of said second fastener in said first direction.

3. The method of claim 1 and further comprising:
causing further movement of said first fastener relative to said second fastener in said second direction;
wherein, said causing further movement causes disengagement of said first fastener from said pivot member first portion; and
wherein, said disengagement of said first fastener from said pivot member first portion causes said pivot member second portion to exit said movement path.

4. The method of claim 1 and further comprising:
providing at least one reciprocally-moveable ram at least partially located within said housing; and
wherein, contact between at least a portion of said ram and at least a portion of said first fastener causes said movement of said first fastener in said second direction.

5. The method of claim 1 and further comprising:
providing a biasing member urging said pivot member toward a position in which said pivot member second portion is removed from said movement path.

* * * * *